United States Patent [19]

Uytterhoeven et al.

[11] Patent Number: 4,980,432
[45] Date of Patent: Dec. 25, 1990

[54] ANIONIC (CO)POLYMERIZATION USING AN ARYLMETHIDE INITIATOR

[75] Inventors: Herman J. Uytterhoeven, Bonheiden; Philippe J. Teyssié, Neuville en Condroz; Roger M. Fayt, Neupre; Luc E. Leemans, Diepenbeek, all of Belgium

[73] Assignee: Agfa-Gevaert, N.V., Mortsel, Belgium

[21] Appl. No.: 179,996

[22] Filed: Apr. 11, 1988

[30] Foreign Application Priority Data

Apr. 24, 1987 [EP] European Pat. Off. ........ 87200780.2

[51] Int. Cl.$^5$ ............................................. C08F 4/08
[52] U.S. Cl. .................................. 526/173; 526/181; 526/273; 526/327; 526/328; 526/340.2; 526/346
[58] Field of Search ........................................ 526/173

[56] References Cited

U.S. PATENT DOCUMENTS

| | | | |
|---|---|---|---|
| 3,287,333 | 11/1966 | Zelinski | 526/173 |
| 3,660,536 | 5/1972 | Ayano et al. | 526/173 |
| 3,970,607 | 7/1976 | Bouton et al. | 526/335 |
| 4,189,555 | 2/1980 | Massoubre | 526/173 |

FOREIGN PATENT DOCUMENTS 946016 1/1964 United Kingdom ................ 526/173

OTHER PUBLICATIONS

Kronzar et al., Journal of the American Chemical Society, (1972), vol. 94, pp. 5750-5759.
Chemical Abstracts, vol. 75, No. 22 (1971), Abstract No. 130327u.
Chemical Abstracts, vol. 75, No. 22, Nov. 29, 1971, pp. 11, Abstract No. 130327w of JP-A-7118721 (Asahi Chemical Industry Co.) 25-5-1971.

*Primary Examiner*—Edward J. Smith
*Attorney, Agent, or Firm*—A. W. Breiner

[57] ABSTRACT

Process for the preparation of polymers by anionic (co)polymerization of ethylenically unsaturated organic monomers in the presence of an arylmethide initiator of the following general structure:

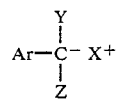

wherein:
  $X^+$ represents a cation;
  Y and Z (same or different) represent a hydrogen atom or an alkyl group;
  Ar represents a condensed aromatic group, including a substituted condensed aromatic group.

5 Claims, No Drawings

ANIONIC (CO)POLYMERIZATION USING AN ARYLMETHIDE INITIATOR

DESCRIPTION

The present invention relates to anionic (co)polymerisation of therefrom.

The anionic polymerisation proceeds with initiators serving as carbanion source. e.g. alkaline organometal compounds such as n-butyllithium.

The interest in anionic polymerisation derives mainly from the possibility to produce so-called "living polymers". The terminology "living polymer" indicates that in anionic polymerisation the polymer chains retain at their growing end a carbanion charge that transfers to further added monomer and makes that only the already existing polymer chains grow. Such makes that the obtained polymer is essentially monodisperse. Anionic polymerisation offers e.g. a simple, reliable synthetic method for the production of polymers with controlled, predictable molecular weights and with functional groups introduced by manipulating the initiator and/or by introducing specific comonomers.

Particularly the anionic polymerisation of (meth)acrylates is a versatile method for preparing polymers with a large variety of chemically tractable functional groups (see Andrews G. D. and Melby L. R. in "New Monomers and Polymers", Cubertson B. M. and Pittman C. U. Jr., Ed., Plenum Press (1984), pages 357 to 380).

The anionic polymerisation of (meth)acrylates however, proceeds with side-reactions taking place between the ester function and the strong nucleophilic carbanion leading to, for instance, a branched structure of the polymer. As described by Freyss D., Leng M. and Rempp P. in Bulletin de la Socéé Chimique de France (1964), Vol. 31. pages 221 to 224, these side-reactions can be avoided by the use of 1.1-diphenylethylene to form a terminal carbanion that shows no interaction with the ester function of the (meth)acrylate monomer but is still capable of effecting its linear polymerisation through the α,β-unsaturated ethylene group. However, 1.1-diphenylethylene is expensive and its purification is difficult.

According to published European Patent Application No. 0 076 539 another initiator also efficiently preventing said side-reactions and synthesized by adding α-methylstyrene to s-butyllithium is used for preparing blockcopolymers comprising (meth)acrylate units. s-Butyllithium is a known initiator for anionic polymerisation. Actually an initiator according to the structural formula (I) is then formed.

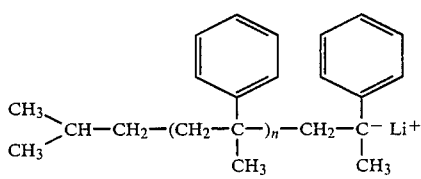

(I)

n is a positive integer

For preparing living homo- or copolymers and blockcopolymers free from α-methylstyrene units, other initiators have to be found that prevent the already mentioned side-reactions and only form a non-repeating terminal anion group labelling each polymer chain.

Benzylsodium, $C_6H_5\text{-}CH_2^-Na^+$, is a known initiator for anionic polymerisation but it is reported that its anion is relatively unstable undergoing some slow rearrangement at room temperature as described by Asami R.. Levy M. and Szwarc M. in Journal of the Chemical Society (1962). pages 361 to 363.

The labelling of polymer chains with a luminescent marker (e.g. anthracene) has been obtained at the chain ends by reaction of compounds containing the luminescent group with functional end-groups (e.g. carboxy groups, see Lushchik V. B., Krakovyak M. G. and Shorokhodov S. S. in Vysokomol. Soedin. (1980). Vol. A22. page 1904) or with "living" ends of the macromolecule generated in anionic polymerisation (see Uihiki H. et al. in Polymer Journal (1979), Vol. 11. page 691). Said labelled polymers can be used for detection purposes.

It is an object of the present invention to provide linear polymers prepared by anionic polymerisation and labelled with a luminescent terminal group.

Other objects and advantages of the present invention will appear from the further description.

According to the present invention a process for the preparation of (co)polymers by anionic (co)polymerisation of ethylenically unsaturated organic monomers in the presence of an arylmethide initiator of the following general structure (II):

(II)

wherein:

$X^+$ represents a cation;

Y and Z (same or different) represent a hydrogen atom or an alkyl group;

Ar represents a condensed aromatic group, including a substituted condensed aromatic group; is provided.

Examples of initiators for use according to the present invention are e.g. 1-naphthylmethyllithium and 9-anthrylmethyllithium.

The synthesis of 1-naphthylmethyllithium and 9-anthrylmethyllithium is described by Schreiber K. C. and Emerson W. in Journal of Organic Chemistry (1966), Vol. 31, pages 95 to 99, Pearson J. M., Williams D. J. and Levy M. in Journal of the American Chemical Society (1971), Vol. 93, pages 5478 to 5482,Kronzer F. J. and Sandel V. R. in Journal of the American Chemical Society (1972), Vol. 94, pages 5750 to 5759.

A detailed description is given hereinafter in preparations 1 and 2. respectively.

PREPARATION 1: Synthesis of 1-naphthylmethyllithium (a) Synthesis of 1,2-di-1-naphthylethane.

A solution of freshly distilled methyliodide (12 g, 85 mmoles) in 50 ml of dry diethylether was added to metallic magnesium windings (2 g, 82 mmoles). A gentle reflux was maintained for one hour whereafter a solution of freshly distilled 1-chloromethylnaphthalene (12.4 g, 70 mmoles) in 25 ml of dry diethylether was slowly added. The mixture was kept refluxing for two more hours, during which a white solid precipitated. The product was recrystallized several times from toluene.

(b) Synthesis of 1-naphthylmethyllithium.

1, 2-di-1-naphthylethane (3.53 g. 12.4 mmoles) was dried by successive azeotropic distillations of tetrahydrofuran (THF) from a polystyryllithium-THF solution. THF solvent (150 ml) distilled from a THEF-polystyryllithium solution was added to the 1,2-di-1-naphthyl)ethane. To the solution was added Li (0.17 g. 24.5 mmoles) with a freshly cleaned metallic surface. After development of a dark red coloration overnight, the solution was filtered in an inert atmosphere. From titration results a yield of about 60 % was calculated.

PREPARATION 2: Synthesis of 9-anthrylmethyllithium (a) Synthesis of 1,2-di-9-anthrylethane.

A solution of 9-anthraldehyde (8.00 g, 0.039 moles) in 100 ml of THF was added with stirring to a suspension of LiAlH$_4$ (4.00 g. 0.106 moles) in 100 ml of THF. The reaction mixture was refluxed with stirring for 2.5 hours. After cooling, the mixture was decomposed by successively adding 10 ml of ethylacetate. 200 ml of water and 50 ml of concentrated hydrochloric acid. The mixture was poured into water and washed with water several times. The product was crystallized from toluene.

(b) Synthesis of 9-anthrylmethyllithium.

1,2-di-9-anthrylethane (4.00 g. $1.05 \times 10^{-2}$ moles) was dried by azeotropic distillations of a THF-polystyryllithium solution. Having repeated these distillations several times, 400 ml of THF was distilled from THF-polystyryllithium and added to the 1 2-di-9-anthrylethane. To the stirred suspension was added Li (0.15 g) with a freshly cleaned metallic surface. After standing overnight the intense green colored solution was filtered under an inert atmosphere. From titration results a yield of 84% was calculated.

According to the present invention linear macromolecules (polymers, copolymers, blockcopolymers) derived from ethylenically unsaturated organic monomers are obtained, in which each macromolecule chain has a terminal fluorescent arylmethyl group, derived from the arylmethide initiator according to formula (II).

Examples of monomers suited for use alone or in combination in anionic polymerisation according to the present invention are: styrene, α-methylstyrene, methylmethacrylate, allylmethacrylate, glycidylmethacrylate, laurylmethacrylate. 2-ethylhexylmethacrylate, t-butylacrylate, ethylacrylate, acrylonitrile, vinylpyridine, isoprene and butadiene.

The conditions for the realisation of the anionic (co)-polymerisation according to the present invention are these usually applied in this type of polymerisation.

Usually a solvent is applied, preferably a polar solvent. Suitable solvents are e.g. tetrahydrofuran, ethers like diethylether, diisopropylether, dibutylether, dimethylether or dioxane, benzene, xylene or toluene. The amount of solvent used is not critical. The solvent is usually purified before the addition of the monomers for polymerisation.

The temperature at which the polymerisation is carried out depends on the nature of the monomer, the solvent and the initiator. Generally the temperature ranges from $-100°$ C. to $50°$ C.

It is desirable to work under pressures large enough to keep the monomer in liquid state.

The polymerisation can be carried out in a continuous or discontinuous way. The monomers can be added at once or in smaller portions.

Usually the deactivation of the living polymer is carried out by the addition of an alcohol or carboxylic acid. The polymer can then be obtained by precipitation in an excess of methanol and subsequently dried.

According to a special embodiment the arylmethide initiator according to general formula (II) can be used in blockcopolymerisation e.g. along the lines described in European Patent Application No. 86202067.4 relating to ab-blockcopolymers consisting of two chemically linked polymeric blocks (a) and (b) of which block (a) is a homo- or copolymer of (an) apolar α,β-ethylenically unsaturated compound(s), and block (b) is derived from an α,β-ethylenically unsaturated monomer containing an epoxy group of which the epoxy group after the blockcopolymerisation has been transformed into an ionic group. The synthesis of said blockcopolymers proceeds according to an embodiment by first preparing an apolar living homo- or copolymer by anionic polymerisation and by allowing the monomer containing an epoxy group to further polymerise with said living polymer. In a final step the epoxy groups of the obtained blockcopolymer are transformed into an ionic group. These blockcopolymers can then be used as dispersing agents in aqueous media and remain resistant to diffusion in wet hydrophilic colloid layers. They are particularly useful dispersing agents in the preparation of polymers produced according to the dispersion polymerisation technique (stable polymer latex dispersion). Particular ab-blockcopolymers such as polylaurylmethacrylate-sulphonated glycidylmethacrylate can be used as diffusion resistant plasticizing agents in hydrophilic colloid layers, e.g. for use in silver halide photographic materials.

By applying the anionic (co)polymerisation according to the present invention using a fluorescent initiator each polymer chain is end-labelled with a fluorescent group. The blockcopolymers mentioned above can then be labelled either at the hydrophobic or at the hydrophilic part. This incorporation of fluorescence probes in polymer chains can be important in the study of e.g. the structure and building of micelles. Latex particles loaded with said labelled blockcopolymers can be used for visual detection of the presence of a binding protein adsorbed on the latex particles. e.g. an antibody, and hence also the presence of a specific bindable substance, e.g. an antigen, due to the fluorescence of the initiator which is covalently attached to the blockcopolymer.

The following examples 1 to 13 illustrate the use of arylmethide initiators according to the above general formula (II) in anionic polymerisation forming living polymers and copolymers containing a luminescent end-group at each polymer chain.

EXAMPLE 1

Anionic polymerisation of methylmethacrylate (MMA) initiated by 9-anthrylmethyllithium In a thoroughly dried 1000 ml balloon flask, kept under pressure with nitrogen, fitted with a three way septum equipped valve, 300 ml of tetrahydrofuran were introduced through the septum by means of a stainless steel capillary. The THF solvent was previously dried on calciumhydride and distilled from benzophenone sodium solution.

To the magnetically stirred solvent a 0.025 M solution of 9-anthrylmethyllithium in THF was dropwise added at ambient temperature until appearance of a persistent green coloration due to 9-anthrylmethyl carbanions. Afterwards 8 ml of 0.025 M 9-anthrylmethyllithium solution ($2.0 \times 10^{-4}$ moles) were added as the required initiator quantity.

The balloon flask was cooled to $-78°$ C. by immersion in an acetone-dry icebath. To the stirred solution at $-78°$ C., 11 g of MMA (110 mmoles) were added. Before addition MMA was dried on calciumhydride and distilled therefrom, whereupon a 1 M triethylaluminium solution in heptane was added dropwise to the cooled monomer just until appearance of the greenish color of the monomer triethylaluminium complex wherefrom the monomer was distilled again.

After 2 hours the living polymer was killed by addition of 10 ml of methanol. The polymer was precipitated by slowly pouring into methanol. Yield of polymer was quantitative.

The molecular weight was determined by gel permeation chromatography (GPC) and expressed as number average molecular weight ($\overline{Mn}$) and weight average molecular weight ($\overline{Mw}$).
$\overline{Mn}$ GPC = 53400
$\overline{Mw}$ GPC = 61000
$\overline{Mw}$ GPC/$\overline{Mn}$ GPC = 1.14

EXAMPLES 2 to 8

Analogously to the method described in example 1, the following polymers having monomer and initiator composition as listed hereinafter in table 1 were prepared.

TABLE 1

| Example No. | Monomer composition in g | Monomer composition in mole $\times 10^{-1}$ | Initiator composition in mole $\times 10^{-4}$ | $\overline{Mn}$ theor. | $\overline{Mn}$ GPC | $\overline{Mw}$ GPC | $\overline{Mw}/\overline{Mn}$ GPC |
|---|---|---|---|---|---|---|---|
| 2 | 15.2 | 1.52 | 6.3(a) | 24100 | 28800 | 33900 | 1.18 |
| 3 | 13.0 | 1.30 | 2.8(b) | 46400 | 51700 | 61700 | 1.19 |
| 4 | 13.1 | 1.31 | 1.1(c) | 119100 | 112300 | 131400 | 1.17 |
| 5 | 9.5 | 0.95 | 1.0(d) | 95000 | 80000 | 91000 | 1.14 |
| 6 | 12.0 | 1.20 | 4.5(e) | 26700 | 32700 | 38300 | 1.17 |
| 7 | 19.6 | 1.96 | 2.5(f) | 78400 | 82400 | 96100 | 1.17 |
| 8 | 14.2 | 1.42 | 1.7(g) | 83500 | 94100 | 109000 | 1.16 |

(a) 25 ml of a 0.0252 M soluton
(b) 5 ml of a 0.0561 M solution
(c) 2 ml of a 0.0561 M solution
(d) 4 ml of a 0.0252 M solution
(e) 8 ml of a 0.0561 M solution
(f) 3 ml of a 0.083 M solution
(g) 2 ml of a 0.083 M solution The living character of the polymers obtained is illustrated by the fact that $\overline{Mn}$ GPC corresponds substantially with $\overline{Mn}$ theor.

EXAMPLE 9

Anionic polymerisation of allylmethacrylate (AMA) initiated by 9-anthrylmethyllithium General procedures and operational experimental conditions are the same as in previous examples except for differences stated in the following procedure.

In a 100 ml balloon flask were introduced 500 ml of THF. A 0.083 M 9-anthrylmethyllithium solution was dropwise added until appearance of a persistent green coloration. 5 ml of a 0.083 M solution of 9-anthrylmethyllithium (0.42 mmoles) were added as the required initiator quantity. After cooling the reactor to $-78°$ C. 15 ml (112 mmoles) of allylmethacrylate (AMA) were added. After 2 hours the living polymer was killed and precipitated in methanol. Yield was quantitative.
GPC (polystyrene calibration) $\overline{Mn} = 39900$; $\overline{Mn} = 46700$; $\overline{Mw}\overline{Mn} = 1.17$

EXAMPLE 10

Block copolymerisation of methylmethacrylate (MMA) and glycidylmethacrylate (GMA) initiated by 9-anthrylmethyllithium In a thoroughly dried 2000 ml balloon flask, kept under pressure with nitrogen, fitted with a three way septum equipped valve, 700 ml of THF solvent were introduced through the septum by means of a stainless steel capillary. The THF solvent was previously dried on calciumhydride and distilled from benzophenone sodium solution. To the magnetically stirred solvent a 0.025 M 9-anthrylmethyllithium solution in THF was dropwise added at ambient temperature, until appearance of a persistent green coloration due to 9-anthrylmethyl carbanions. Afterwards 60 ml of a 0.025 M 9-anthrylmethyllithium solution ($1.5 \times 10^{-3}$ moles) were added as the required initiator quantity. The balloon flask was cooled to $-78°$ C. by immersion in an acetone-dry icebath. To the stirred solution at $-78°$ C., 4.7 g of MMA (47 mmoles) were added. Before addition MMA was dried on calciumhydride and distilled therefrom, whereupon a 1 M triethylaluminium solution in heptane was added dropwise to the cooled monomer just until appearance of the greenish color of the monomer triethylaluminium complex wherefrom the monomer was distilled again.

After 2 hours a 20 ml aliquot was withdrawn for prepolymer analysis.

Thereupon 20.5 g of GMA were added. Preceding the addition the GMA was purified by a double fractionated distillation, dried on calciumhydride and further purified by an azeotropic distillation of a toluene-polystyryllithium solution.

After 2 hours the living polymer was killed and precipitated in methanol. Yield was quantitative.
GPC (polystyrene calibration) $\overline{Mn} = 13800$; $\overline{Mw} = 19800$; $\overline{Mw}E,ovs/\overline{Mn}/ = 1.43$

EXAMPLE 11

Anionic polymerisation of isoprene initiated by 9-anthrylmethyllithium

General procedure and operational experimental conditions were the same as in previous examples except for differences stated in the following procedure.

In a 1000 ml balloon flask were introduced 250 ml of toluene that was distilled from a polystyryllithium solution in toluene. A 0.025 M 9-anthrylmethyllithium solution was added dropwise until appearance of a persistent green coloration. 9-Anthrylmethyllithium solution (2.0×10$^{-4}$ moles) was added as the required initiator quantity. Afterwards 15 ml (150 mmoles) of isoprene were added. After 18 hours the polymer was killed and precipitated in methanol. Yield was quantitative.

EXAMPLE 12

Anionic polymerisation of styrene initiated by 9-anthrylmethyllithium

General procedure and operational experimental conditions were the same as in example 11 except that THF was used as solvent for the polymerisation of styrene. The obtained living polymer was killed after 2 hours and precipitated in methanol. Yield was quantitative.

EXAMPLE 13

Anionic polymerisation of methylmethacrylate (MMA) initiated by 1-naphthylmethyllithium In a thoroughly dried 1000 ml balloon flask, kept under pressure with nitrogen, fitted with a three way septum equipped valve, 300 ml of THF were introduced through the septum by means of a stainless steel capillary. The THF solvent was previously dried on calciumhydride and distilled from benzophenone sodium solution. To the magnetically stirred solvent a 0.076 M 1-naphthylmethyllithium solution in THF was dropwise added at ambient temperature, until appearance of a persistent red coloration due to 1-naphthylmethyl carbanions.

Afterwards 12 ml of 0.076 M 1-naphthylmethyllithium solution (9.1×10$^{-4}$ moles) were added as the required initiator quantity. The balloon flask was cooled to −78 ° C. by immersion in an acetone-dry icebath. To the stirred solution at −78 ° C., 11 g of MMA (110 mmoles) were added. Before addition MMA was dried on calciumhydride and distilled therefrom, whereupon a 1 M triethylaluminium solution in heptane was added dropwise to the cooled monomer just until appearance of the greenish color of the monomer triethylaluminium complex wherefrom the monomer was distilled again.

After two hours the living polymer was killed by addition of 10 ml of methanol. The polymer was precipitated by slowly pouring into methanol. Yield of polymer was quantitative.

We claim:

1. Method of preparing linear polymers by anionic (co)polymerisation of ethylenically unsaturated organic monomers in the presence of an initiator as carbonion source, the improvement comprising the use as initiator of arylmethide corresponding to the following general structure:

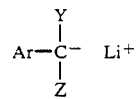

wherein:
Y and Z (same or different) represent a hydrogen atom or an alkyl group;
Ar represents a condensed aromatic group, including a substituted condensed aromatic group.

2. Method according to claim 1, wherein the arylmethide initiator corresponds to one of the following structural formulae:

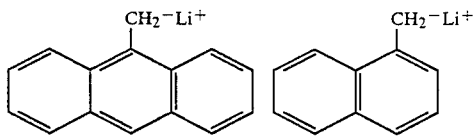

3. Method according to claim 1, wherein the monomer is a member selected from the following group of monomers: styrene, α-methylstyrene, methylmethacrylate, allymethacrylate, glycidylmethacrylate, laurylmethacrylate, 2-ethyhexylmethacrylate, t-butylacrylate ethylacrylate, acrylonitrile, vinylpyridine, isoprene, butadiene.

4. Linear polymers derived from ethylenically unsaturated organic monomers, in which each polymer chain has a terminal fluorescent arylmethyl group derived from an arylmethide initiator of the following general structure:

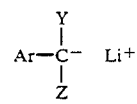

wherein:
Y and Z (same or different) represent a hydrogen atom or an alkyl group;
Ar represents a condensed aromatic group, including a substituted condensed aromatic group.

5. Linear polymers according to claim 4, wherein the arylmethide initiator corresponds to one of the following structural formulae:

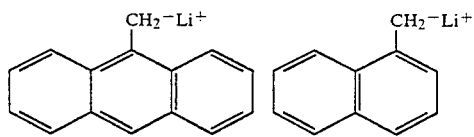

* * * * *